March 11, 1969 W. M. AUTRY ET AL 3,432,297

PHOTOMECHANICAL COLOR PROVING PROCESS

Filed July 21, 1965

INVENTORS
WALLACE M. AUTRY
& CLIFFORD P. CHAPMAN

BY Joseph A. Hill
ATTORNEY

United States Patent Office 3,432,297
Patented Mar. 11, 1969

3,432,297

PHOTOMECHANICAL COLOR PROVING PROCESS

Wallace M. Autry, Rockville, and Clifford P. Chapman, Silver Spring, Md., assignors to the United States of America as represented by the Secretary of the Army Filed July 21, 1965, Ser. No. 473,875
U.S. Cl. 96—27 5 Claims
Int. Cl. G03c 7/00

ABSTRACT OF THE DISCLOSURE

This invention is an improvement in the Ozalid Dychrome Process for making multicolor photomechanical reproductions in which a light sensitive diazo oxide layer on a base is exposed to a color separation negative corresponding to one of the primary color aspects of the subject, the photo decomposed products in the exposed areas are removed, and the corresponding base areas are coated with a basic water soluble dye, the improvement comprising rendering the dye insoluble with a mordanting agent and impervious to subsequent contact with other dyes and processing chemicals. This improvement eliminates the prior procedure of removing the unexposed areas after coating the exposed areas and resensitizing the base for the next color exposure.

The invention described herein may be manufactured and used by or for the Government for governmental purposes without the payment to us of any royalty thereon.

BACKGROUND OF THE INVENTION

Field of the invention

This invention relates to a photomechanical color proving process and more particularly to a multicolor reproduction process using light sensitive diazo oxide in which it is unnecessary to resensitize a base material after each exposure to color separation negatives.

Description of the prior art

In particular this invention is an improvement of the Ozalid Dychrome Process described in U.S. Patent 2,993,-788. Briefly described, the process of that patent produces a multicolor reproduction by coating a base with a hydrophobic resin and in turn coating the resin with a hydrophobic light sensitive layer containing a light sensitive diazo oxide. The assembly is then exposed to a color separation negative corresponding to one of the primary color aspects of the subject. It is subsequently developed by swabbing with an alkaline developing solution which removes the photo-decomposed products in the exposed areas and also renders the hydrophobic resin hydrophillic in the areas from which the photosensitive material has been removed. The assembly is then contacted with a water soluble basic dye, corresponding in color to the color separation negative, which dyes the hydrophillic portions of the coating. The unexposed portions of the light sensitive layer are then removed with a suitable organic solvent and the whole assembly resensitized by coating with the resinous light sensitive hydrophobic material.

The above process is then repeated with each color separation negative of the set until the complete color reproduction is obtained. The above description sets forth the general steps of the process, the particular materials used therein being disclosed in detail in the patent.

As can be seen from the above description, it is necessary to remove the unexposed photosensitive material and then resensitize the whole assembly after exposure to each of the color separation negatives in the set. This procedure is necessary in the process to prevent the subsequently applied dyes and processing chemicals from contaminating the previously dyed areas but it is also obvious that the step is both wasteful and time consuming.

SUMMARY OF THE INVENTION

We have invented a procedure whereby the above described process can be practiced without the necessity of removing the unexposed material and resensitizing the assembly. Broadly, this is accomplished by rendering the dye insoluble and impervious to subsequent dye and processing chemicals contact. It has also been found that tannic acid and antimony-potassium tartrate (tartar emetic) are mordanting agents for the dyes used in the process to render the dyes insoluble. It has also been found, although the chemical mechanism is not known, that aqueous solutions of magnesium nitrate and chromium potassium sulfate (chrome alum) render the mordanted dye impervious to subsequent contact with other dyes and processing chemicals.

It is accordingly an object of this invention to provide a diazo color reproduction process wherein it is unnecessary to resensitize the base sheet for each exposure to color separation negatives.

It is a further object of this invention to render the water soluble dyes used in a diazo color reproduction process insoluble and impervious to subsequent treatment in the process.

These and other objects of the invention will be readily apparent from the following description of the invention, reference being made to the accompanying drawings wherein:

DESCRIPTION OF THE PREFERRED EMBODIMENTS

Figure 1:
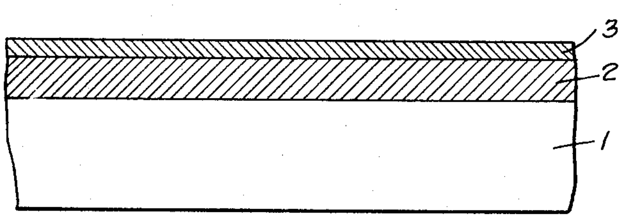
FIG. 1 represents the unexposed photosensitive support.

Referring now to FIG. 1, a support 1 is coated with a layer 2 comprising a copolymer of maleic anhydride and an alkyl vinyl ether in association with a hydrophobic resin and 3 is a hydrophobic layer containing a light sensitive diazo oxide.

Figure 2:
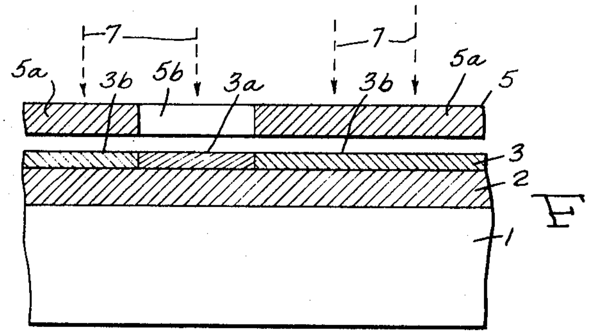
FIG. 2 represents the support during exposure to a color separation negative.
Figure 3:
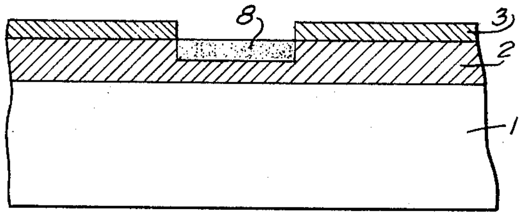
FIG. 3 represents the support after the first development.

FIG. 2 shows the assembly of FIG. 1 during exposure of one negative 5 of a set of color separation negatives to a light source 7. **5*a* represents opaque areas and 5*b* represents transparent areas of the negative while 3*a* represents exposed and 3*b* unexposed portions of the photosensitive layer 3. After exposure the layer 3 is swabbed with an alkaline developing solution which removes the photo decomposed products in the exposed areas 3*a***.

Figure 4:
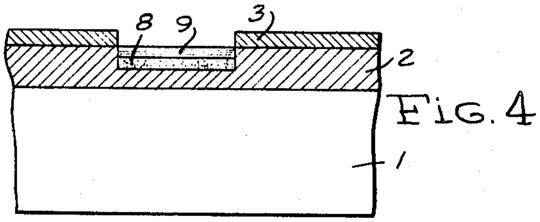
FIG. 4 represents the support after the dying step.

This procedure allows the alkaline developing solution to contact layer 2 in the exposed areas and such contact with the developer renders layer 2 hydrophillic at 8. The assembly is then contacted with a water soluble basic dye 9, of the color desired from the color separation negative, which dyes the hydrophillic portion 8 of layer 2 but does not affect the hydrophobic portions as shown in FIG. 4. Up to this point, the process is substantially the same with regard to both materials used and procedure as described in U.S. Patent 2,993,788 and reference is specifically made thereto for the specific materials usable in the process.

Figure 5:
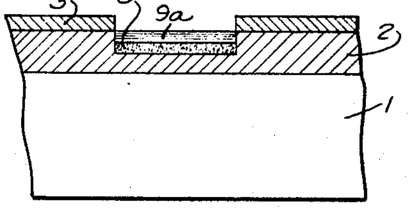
FIG. 5 represents the support after the mordanting step.
Figure 6:
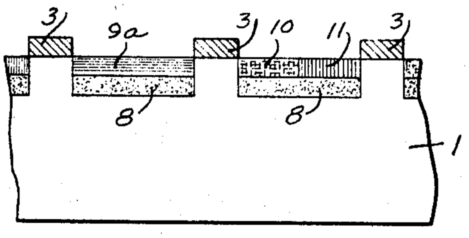
FIG. 6 represents the support after three colors have been applied.
Figure 7:
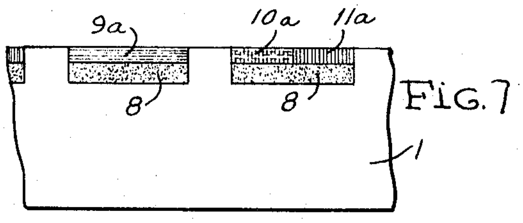
FIG. 7 represents the support after the photosensitive coating is removed.

After dyeing, the assembly is treated to mordant the dye 9 rendering it insoluble. This is accomplished by contacting the assembly with an aqueous tannic acid solution or an aqueous tartar emetic solution and the structure with the insoluble dye *9a* is shown in FIG. 5. The assembly is then neutralized by treatment with a weakly basic solution such as sodium acetate and then stabilized with a magnesium nitrate or chrome alum solution to render it impervious to subsequent application of dyes and processing solutions. The assembly is then ready for exposure to the next negative of the color separation set and the developing, mordanting, neutralizing and stabilizing steps are repeated for each such negative. The support after three exposures is shown in FIG. 6 with 10 and 11 representing two differently colored areas in addition to *9a*.

After the last dye has been mordanted the remaining sensitizer is removed by swabbing with anhydrous alcohol and the finished color reproduction is ready for use. This process can be used to produce any type of color reproduction but it has been found to have great utility in the photo reproduction of color maps on transparent backgrounds.

In the above process the concentrations of the tannic acid, tartar emetic and the neutralizing and stabilizing solutions are not critical. However, it has been found that aqueous solutions of the materials of about 10 percent by weight are particularly useful and convenient in the process. The following examples are illustrative of the instant process.

EXAMPLE I

A cellulose triacetate base having a hydrophobic resinous layer coated with a hydrophobic photosensitive resinous base containing a diazo oxide as described in U.S. Patent 2,993,788 was exposed for 90 seconds to the radiations of a carbon arc beneath a blue color separation negative of a set of color separations. The photo decomposed products were removed by swabbing with a solution of 60 parts ethylene glycol, 20 parts ethanolamine and 20 parts of glycerine and immersed in a solution comprising:

800 ml. water
200 ml. ethylene glycol
2 g. methylene blue
2 ml. diethanolamine for 20 seconds. Excessive dye was removed. The sheet was then swabbed with a solution comprising:

16 oz. tannic acid powder
128 oz. water to mordant the dye. The residual tannic acid was neutralized by swabbing with a weakly basic aqueous sodium acetate solution of about 10 percent by weight. The sheet was then swabbed with 10 percent aqueous solution of magnesium nitrate. The excess was removed and the sheet dried.

The dried sheet was then exposed beneath the yellow separation negative of the set developed as above and dyed in a solution comprising:

800 ml. water
200 ml. ethylene glycol
2.5 g. Auramine O
2 ml. diethanolamine

The excessive dye was removed and the sheet was treated with tannic acid, sodium acetate and magnesium nitrate as set forth above.

The dried sheet was than exposed to the red color separation negative of the set, developed as above and then dyed in a bath comprising:

800 ml. water
200 ml. ethylene glycol
4.0 g. magenta ABN
2 ml. diethanolamine

The excess was removed and the sheet treated with tannic acid, sodium acetate and magnesium nitrate as described above.

The dried sheet was then exposed to the black color separation negative, developed as above and dyed in a solution comprising:

800 ml. water
200 ml. ethylene glycol
1 ml. diethanolamine
3.0 g. Thioflavine TCND
0.4 g. Magenta ABN
0.5 g. Brilliant Green Crystals
1.5 ml. Methylene Blue The excess dye was removed and the sheet treated with tannic acid sodium acetate and magnesium nitrate as above and dried. The remaining photosensitive material was removed by swabbing with anhydrous alcohol. It should be noted that it is not necessary to mordant and stabilize the last exposure of the set since no further exposure of the color print is contemplated. However, it was done in the above example to test the process on the black dye. The finished sheet was then immersed in the blue dye solution and washed. No dyeing by the blue dye was observed and the finished product was extremely clear and bright color reproduction.

EXAMPLE II

The process of Example I was repeated substituting Genacryl Blue 6G, Euchrysine GGA and Genacryl Red 6B were substituted for the Methylene Blue, Auramine O Magenta ABN in the blue, yellow and red baths respectively.

The tannic acid, sodium acetate and magnesium nitrate solutions were also replaced by 10 percent aqueous solutions of tartar emetic, potassium acetate and chrome alum, respectively. A clear, bright color reproduction was obtained.

EXAMPLE III

The process of Example I was repeated using the following dye baths in place of the blue, yellow and red baths respectively.

Blue:
- 750 ml. water
- 250 ml. ethylene glycol
- 2 ml. diethanolamine
- 2.5 g. Genacryl Blue 5B Yellow:
- 750 ml. water
- 250 ml. ethylene glycol
- 2 ml. diethanolamine
- 3.0 g. Genacryl Yellow 3G Red:
- 750 ml. water
- 250 ml. ethylene glycol
- 1 ml. monoethanolamine
- 3.0 g. S franine Y A pleasing, clear, bright color reproduction was obtained.

EXAMPLE IV

The process of Example II was repeated except that the dye baths of Example III were substituted for the blue, yellow and red dye baths of Example IV. An excellent color reproduction was obtained.

The basic dyes used in the above examples are given for illustration only and are not of those suitable. Other suitable basic dyes are described in the Color Index, volume 1 second edition 1956 and include Color Index Basic Yellow 1, 2, 4, 10 and 11; Color Index Basic Orange 14, 22; Color Index Basic Red 1, 2, 5, 9 and 13;

Color Index Basic Violet 1, 3, 4, 5, 7, 10 and 14; Color Index Basic Blue 1, 5, 6, 9 and 12; and Color Index Basic Green 1 and 4.

The invention is not limited to the specific details set forth above but includes all modifications and substitutions within the scope of the following claims.

We claim:

1. In a multicolor reproduction process wherein a support comprising a base material provided with a layer of normally hydrophobic resin said layer being coated with a hydrophobic resin composition containing a photosensitive diazo oxide is sequentially exposed to a set of color separation negatives, the photo decomposed products removed after each exposure by treatment with an alkaline developing solution which renders the uncovered portion of the normally hydrophobic layer hydrophillic and the hydrophillic portions are dyed after each exposure by contact with a water soluble basic dye, the improvement comprising the steps of:

(a) mordanting the water soluble dye after dyeing, and (b) stabilizing the dye in situ to render it impervious to subsequent contact with water soluble basic dyes and processing solutions.

2. The process of claim 1 wherein the dye is mordanted by contact with an aqueous solution of a mordanting agent selected from the group consisting of tannic acid and tartar emetic, the mordanting agent is neutralized by contact with a weakly basic aqueous solution and the dye is stabilized by contact with an aqueous solution of a material selected from the group consisting of magnesium nitrate and chrome alum.

3. A process for producing a color reproduction on a light sensitive support comprising a base, a normally hydrophobic resin containing layer on said base and a photosensitive hydrophobic resinous coating containing a diazo oxide on said layer comprising the steps of:

(a) exposing to a light source said photosensitive support beneath one color separation negative of a set of color separation negatives, (b) removing the photodecomposed products in said coating, (c) converting the uncovered portions of the hydrophobic layer to hydrophillic form, (d) dyeing said hydrophillic portions with a water soluble basic dye, (e) mordanting said dye, (f) stabilizing said mordanted dye to render it impervious to subsequent dyeing and processing solutions, (g) repeating the above steps with subsequent color separation negatives of the set, and (h) removing the remaining photosensitive coating.

4. The process of claim 3 wherein:

(a) the dye is mordanted by contact with a mordanting agent selected from the group consisting of tannic acid and tartar emetic, and (b) the mordanted dye is stabilized by contact with a stabilizing agent selected from the group consisting of magnesium nitrate and chrome alum.

5. The process of claim 4 wherein the excess tannic acid is neutralized by contact with an aqueous solution of a weak base.

References Cited

UNITED STATES PATENTS

| | | | |
|---|---|---|---|
| 1,536,151 | 5/1925 | Scholz | 8—74 |
| 2,074,197 | 3/1937 | Wormald | 8—65 |
| 2,993,788 | 7/1961 | Straw et al. | 96—49 X |

OTHER REFERENCES

Diserens: Chemical Technology of Dyeing and Printing, vol. 2, 1952, pp. 39, 84–89, 100.

Freedland et al.: Textile Colorist, "Resisting Animal Fibers for Effect Stripes and Union Dyeing," vol. 56, 1934, p. 399.

Olney: Chem. Abstracts, Dyes and Textile Chemistry, 1943, pp. 1273–74.

NORMAN G. TORCHIN, *Primary Examiner.*

R. E. MARTIN, *Assistant Examiner.*

U.S. Cl. X.R.

96—49